United States Patent [19]
Schultz

[11] 3,738,056
[45] June 12, 1973

[54] TURKEY CALL

[76] Inventor: Fred R. Schultz, 3328 Havard Street, Lower Burrell, Pa. 15068

[22] Filed: Sept. 17, 1971

[21] Appl. No.: 181,541

[52] U.S. Cl. .................................................. 46/178
[51] Int. Cl. .............................................. A63h 5/00
[58] Field of Search .................... 46/178, 179, 180, 46/1

[56] References Cited
UNITED STATES PATENTS

| 1,367,176 | 2/1921 | Bridges | 46/180 |
| 2,274,897 | 3/1942 | Horne | 46/179 |

Primary Examiner—Hugh R. Chamblee
Assistant Examiner—Robert F. Cutting
Attorney—Walter G. Sutcliff

[57] ABSTRACT

A simplified molded plastic turkey call which includes male and female mating frame portions and a diaphragm extending in a taut condition from the male and female mating portions.

6 Claims, 4 Drawing Figures

TURKEY CALL

BACKGROUND OF THE INVENTION

The use of a membrane or a diaphragm as sound producing means for use as a sound producing instrument or as a bird call, is of course well known in the art. Bird calls utilizing a vibrating membrane which are fitted in the mouth of the user to produce the sound are also well known.

Prior art diaphragm type bird calls have been difficult to assemble, with the diaphragm generally being held taunt and glued in place. Since the call is designed for use in the mouth, metallic calls are objectionable, and at times toxic.

Since the device works by passing air over the taunt membrane or diaphragm, it is important that the diaphragm can be readily pulled taunt during assembly of the call, and maintained in that condition during use.

SUMMARY OF THE INVENTION

A simplified diaphragm-type bird call is provided with a simplified structure which allows for low-cost production and for ease of assembly. The bird call comprises a generally U-shaped frame member comprised of male and female mating portions which are molded to fit within each other, and are preferably formed as a unitary molded piece joined together at respective extending ends of the arms of the U-shaped portion by resilient hinge means. The male or female portions are brought together by bending the hinge means through a 180° arc. The female mating portion has a channel formed therein, and the male mating portion has a channel fitting projection whereby mating of the male and female portions is effected. A generally planar webbing extends outwardly from the exterior edge of the generally U-shaped member. A planar diaphragm over which air is directed to produce the desired bird call sound is mounted from the frame, with the outer edges of the diaphragm fitting between the male and female portion of the frame member, and preferably with the diaphragm extending substantially over the area defined within the U-shaped frame.

BRIEF DESCRIPTION OF THE DRAWINGS

The invention can be best understood by reference to the exemplary embodiment shown in the drawings. In FIG. 1 the assembled bird call 10 is seen in a plan view. The bird call 10 comprises a generally U-shaped frame member 11 which is in turn comprised of a male portion 12 and a mating female portion 13. Resilient hinge means 14 joins the male portion 12 and female portion 13 together at the respected extending ends of the arms of these U-shaped portions. Generally planar webbing 15 extends from the exterior edge of the generally U-shaped member 11. A planar membrane or diaphragm 16 is mounted from the frame with the outer edges of the diaphragm fitted within the male and female portions 12 and 13 of the frame member 11. The membrane or diaphragm 16 extends in a taunt, stretched condition substantially over the area defined within the U-shaped frame when the male and female portions are mated together.

Figure 1:
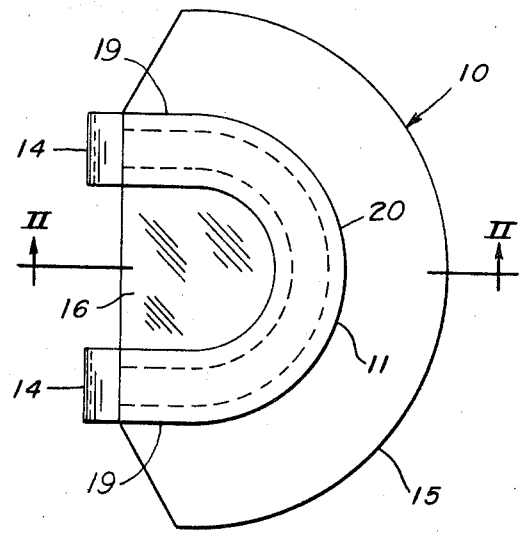
FIG. 1 is a bird call of the present invention in an assembled plane view.
Figure 2:
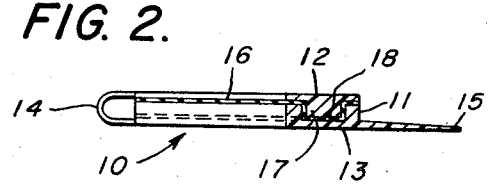
FIG. 2 is a side elevational view of the bird call shown in FIG. 1 taken along the plane of line II—II.

The male portion 12 of the frame member 11 has a channel fitting projection 17 extending therefrom. The female portion 13 of the frame member 11 has a channel 18 formed therein. The channel fitting projection 17 tightly fits the channel 18 to allow for assembly of the bird call 10.

The male and female mating portions 12 and 13 which comprise the generally U-shaped frame member 11, each comprise a pair of generally parallel legs 19 which extend from curved connecting portion 20.

Figure 3:
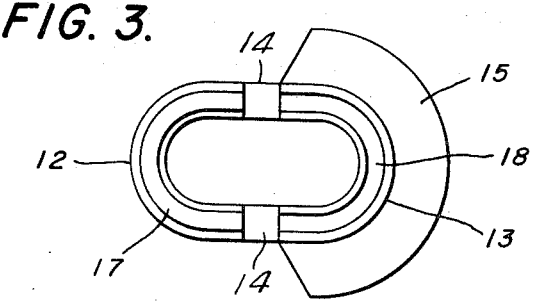
FIG. 3 is a plane view of the generally U-shaped member of the preferred embodiment wherein the male and female portions are molded as a unitary piece.

The bird call of the present invention is preferably produced by forming a unitary injection molded plastic frame member as seen in FIG. 3. The frame member 11 is molded as a generally planar unitary piece, with the male portion 12 and female portion 13 being joined together by hinge means 14. The planar arcuate membrane 16 is disposed over either the male or female portion of the frame member, and the male and female portions are brought together with resilient hinged bending in a 180° arc to allow the male and female portions to be mated together in an assembled bird call. The channel fitting projection 17 forces the outer edge of the membrane 16 down into the channel 18 to retain the membrane, and also to stretch the membrane and to place it under proper tension for effecting the bird call.

Figure 4:
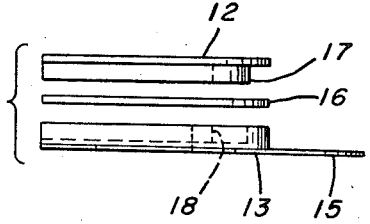
FIG. 4 is an exploded view in side elevation of another embodiment of the bird call of the present invention wherein the male and female portions of the frame member are molded separately.

The frame member in the embodiment shown in FIG. 4 comprises two separately molded portions, again a male portion 12 and a female portion 13.

The frame member is formed of a thermosetting material, preferably of polyethylene, or a plastic homopolymer, co-polymer, multi-polymer, latex rubber composition, or other such moldable composition. The diaphragm or membrane 16 is preferably formed of a rubberous latex composition which is resilient and stretchable but can be formed of a variety of such pliable, resilient materials. The assembled bird call is preferably heat treated to effectively seal the diaphragm within the male and female portions and join the male and female portions together. The materials used in constructing the bird call are formed of non-toxic materials since use of the device is anticipated in the mouth of the user.

The device functions by inserting the device into the mouth with the webbing 15 first entering the mouth. The webbing 15 is positioned proximate the roof of the mouth with the tongue being placed proximate the bend of the U-shaped frame member, and a blowing motion directs air over the membrane to produce the desired bird call sound.

The diaphragm or membrane 16 can comprise a single membrane, or several thin membrane together.

I claim:

1. A bird call for turkeys and the like, comprising:
   a. a generally U-shaped frame member having parallel legs and a curved connecting portion, and which frame member comprises abutting male and female mating portions;

b. a generally planar webbing extending outwardly from the exterior edge of the generally U-shaped frame member; and c. a planar diaphragm the outer edges of which of the frame member to tautly secure the diaphragm thereto, which diaphragm extends substantially over the area defined between the legs of the U-shaped frame.

2. The bird call defined in claim 1, wherein the frame member is preferably a unitary molded piece with U-shaped male and female mating portions joined together at the respective extending ends of the arm of U-shaped portions by resilient hinge means which is bendable through a 180° arc, so that the male and female portions can be mated together in an assemblied position.

3. The bird call defined in claim 1, wherein the female mating portion has a channel formed therein, and the male mating portion a channel fitting projection whereby mating of the male and female portions is effected.

4. The bird call defined in claim 1, wherein the male and female mating portions are heat sealed together forming the frame member.

5. The bird call defined in claim 1, wherein the generally U-shaped frame member is formed of polyethylene and the diaphragm of a rubberous latex material.

6. The bird call defined in claim 1, wherein the webbing extends in a plane continuous with the surface of one of the mating portions.

* * * * *